United States Patent
Cho et al.

(10) Patent No.: US 9,574,814 B2
(45) Date of Patent: Feb. 21, 2017

(54) REFRIGERATOR AND CONTROL METHOD FOR THE SAME

(71) Applicant: Samsung Electronics Co., Ltd., Suwon-si (KR)

(72) Inventors: Sung Ho Cho, Gwangju (KR); Woo Sung Kim, Gwangju (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 362 days.

(21) Appl. No.: 13/935,742

(22) Filed: Jul. 5, 2013

(65) Prior Publication Data

US 2014/0013779 A1 Jan. 16, 2014

(30) Foreign Application Priority Data

Jul. 10, 2012 (KR) .................. 10-2012-0075289
May 22, 2013 (KR) .................. 10-2013-0057687

(51) Int. Cl.
*F25D 11/02* (2006.01)
*F25D 29/00* (2006.01)

(52) U.S. Cl.
CPC .......... *F25D 11/02* (2013.01); *F25D 11/022* (2013.01); *F25D 29/00* (2013.01); *F25B 2400/06* (2013.01); *F25D 2700/12* (2013.01); *F25D 2700/122* (2013.01)

(58) Field of Classification Search
CPC ........ F25D 11/02; F25D 11/022; F25D 29/00; F25D 2700/12; F25D 2700/122
USPC ........................................ 62/158, 175, 441
See application file for complete search history.

(56) References Cited

U.S. PATENT DOCUMENTS

| 6,119,469 A * | 9/2000 | Elwood ............... F25B 49/025 307/40 |
| 2004/0016254 A1* | 1/2004 | Park ..................... F25D 29/00 62/229 |
| 2009/0001866 A1 | 1/2009 | Kaga et al. |

FOREIGN PATENT DOCUMENTS

| CN | 1470833 | 1/2004 |
| CN | 1621758 | 6/2005 |
| JP | EP 1536186 A1 * | 6/2005 ............. F25B 13/00 |
| JP | 2010-60146 | 3/2010 |
| KR | 10-2003-0078477 | 10/2003 |
| KR | 10-2013-0024210 | 3/2013 |
| TW | 406174 | 9/2000 |

OTHER PUBLICATIONS

Chinese Office Action dated Jul. 26, 2016 in Chinese Patent Application No. 201310288739.2.

* cited by examiner

*Primary Examiner* — Marc Norman
(74) *Attorney, Agent, or Firm* — Staas & Halsey LLP

(57) ABSTRACT

A refrigerator includes a plurality of storage compartments, a plurality of cooling units to cool the plurality of storage compartments, a temperature sensing unit to sense temperatures of the plurality of storage compartments, a drive unit to drive the plurality of cooling units, and a controller to control the drive unit to drive the cooling unit that satisfies a predetermined driving condition. If at least one cooling unit among the plurality of cooling units is being driven, the controller delays driving the other cooling unit even if the other cooling unit satisfies the driving condition. The refrigerator minimizes simultaneous driving a plurality of compressors, which may prevent generation of noise and vibration, as well as excessive power consumption, due to driving the plurality of compressors.

12 Claims, 8 Drawing Sheets

REFRIGERATOR AND CONTROL METHOD FOR THE SAME

CROSS-REFERENCE TO RELATED APPLICATIONS

This application claims the priority benefit of Korean Patent Application No. 10-2012-0075289, filed on Jul. 10, 2012 and Korean Patent Application No. 10-2013-0057687, filed on May 22, 2013 in the Korean Intellectual Property Office, the disclosures of which are incorporated herein by reference.

BACKGROUND

1. Field

The following description relates to a refrigerator using a plurality of compressors, and a control method for the same.

2. Description of the Related Art

A refrigerator is an apparatus that keeps food and beverages, for example, fresh for a long time.

A refrigerator has a plurality of storage compartments including a freezing compartment in which food is kept below a freezing temperature, and a refrigerating compartment in which food is kept at a temperature slightly above freezing. In addition, a variable temperature chamber for long time storage of fresh goods, such as vegetables and fish, for example, may be provided.

Such a refrigerator keeps a storage compartment at a predetermined target temperature via an iterative implementation of a refrigeration cycle consisting of compression, condensation, expansion, and evaporation of a refrigerant. That is, the refrigerator supplies air, cooled by an evaporator provided for each storage compartment, into each storage compartment based on a target temperature of the storage compartment, thereby keeping the storage compartment at the target temperature.

Conventional refrigerators keep a freezing compartment and a refrigerating compartment at respective target temperatures using a single evaporator and do not provide appropriate cooling environments.

In recent years, a refrigerator in which evaporators are respectively provided at a freezing compartment and a refrigerating compartment has been developed. The refrigerator includes a switching valve to control a flow path of refrigerant to be supplied to the evaporator provided at the freezing compartment or the refrigerating compartment, such that the refrigerant, condensed through a compressor and a condenser, is supplied to the evaporator provided at the freezing compartment or the refrigerating compartment according to temperatures of the freezing compartment and the refrigerating compartment.

However, the aforementioned refrigerator adopts a single compressor and a single condenser, causing difficulty in simultaneously cooling the freezing compartment and the refrigerating compartment, which differ greatly in target temperature. Moreover, due to addition of a variable temperature chamber for storage of fresh goods, such as vegetables, fish, or meat, and a considerable increase in capacities of the freezing compartment and the refrigerating compartment, insufficient compressor capacity has become a major issue.

SUMMARY

Therefore, it is an aspect of the present disclosure to provide a refrigerator using a plurality of compressors and a control method for the same.

Additional aspects of the invention will be set forth in part in the description which follows and, in part, will be obvious from the description, or may be learned by practice of the invention.

In accordance with an aspect of the present disclosure, a refrigerator includes a plurality of storage compartments, a plurality of cooling units to cool the plurality of storage compartments, a temperature sensing unit to sense temperatures of the plurality of storage compartments, a drive unit to drive the plurality of cooling units, and a controller to control the drive unit to drive the cooling unit that satisfies a predetermined driving requirement, wherein if at least one cooling unit among the plurality of cooling units is being driven, the controller delays driving the other cooling unit even if the other cooling unit satisfies the driving requirement. The driving requirement may include the temperature of the storage compartment reaches or exceeds a predetermined upper limit temperature.

If the at least one cooling unit is being driven, the controller may drive the other cooling unit if the other cooling unit satisfies a predetermined delayed driving requirement.

The delayed driving requirement may include the temperature of the storage compartment that is cooled by the other cooling unit reaches or exceeds a predetermined delay temperature.

The delayed driving requirement may include a predetermined delay time has passed after the at least one cooling unit is driven.

The controller may reduce driving rates of the at least one cooling unit and the other cooling unit if the at least one cooling unit and the other cooling unit are driven simultaneously.

The controller may stop driving the at least one cooling unit if the other cooling unit satisfies the delayed driving requirement.

The controller may drive the other cooling unit if the at least one cooling unit satisfies a predetermined driving stop requirement, even though the other cooling unit does not satisfy the delayed driving requirement.

The driving stop requirement may include the temperature of the storage compartment that is cooled by the at least one cooling unit reaches or falls below a predetermined lower limit temperature.

In accordance with an aspect of the present disclosure, a control method for a refrigerator including a plurality of storage compartments, a plurality of cooling units to cool the plurality of storage compartments, and a temperature sensing unit to sense temperatures of the plurality of storage compartments, includes driving at least one cooling unit among the plurality of cooling units that satisfies a predetermined driving requirement, and delaying driving the other cooling unit if the at least one cooling unit is being driven, even through the other cooling unit satisfies the driving requirement.

Delaying driving the other cooling unit may include driving the other cooling unit if the other cooling unit satisfies a predetermined delayed driving requirement.

The control method may further include, if the other cooling unit is being driven, driving the at least one cooling unit as well as the other cooling unit by reducing driving rates of the at least one cooling unit and the other cooling unit.

The control method may further include stopping driving the at least one cooling unit if the other cooling unit is driven.

Driving the at least one cooling unit may include the cooling unit that cools any one of the plurality of storage compartments, the temperature of which reaches or exceeds a predetermined upper limit temperature.

Driving the other cooling unit may include driving the other cooling unit if the temperature of the storage compartment that is cooled by the other cooling unit reaches or exceeds a predetermined delay temperature.

In accordance with an aspect of the present disclosure, a refrigerator includes a refrigerating compartment, a freezing compartment spatially separated from the refrigerating compartment, a first cooling unit to cool the refrigerating compartment, a second cooling unit to cool the freezing compartment, a temperature sensing unit to sense temperatures of the refrigerating compartment and the freezing compartment, a drive unit to drive the first cooling unit and the second cooling unit, and a controller to control the drive unit to drive the first cooling unit or the second cooling unit that satisfies a driving requirement, wherein if at least one of the first cooling unit and the second cooling unit is being driven, the controller delaying driving the other cooling unit even if the other cooling unit satisfies the driving requirement.

The driving requirement may include the temperature of the storage compartment reaches or exceeds an upper limit temperature.

If the at least one cooling unit is being driven, the controller may drive the other cooling unit if the other cooling unit satisfies a predetermined delayed driving requirement.

The delayed driving requirement may include the temperature of the storage compartment that is cooled by the other cooling unit reaches or exceeds a predetermined delay temperature.

The delayed driving requirement may include a predetermined delay time has passed after the at least one cooling unit is driven.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
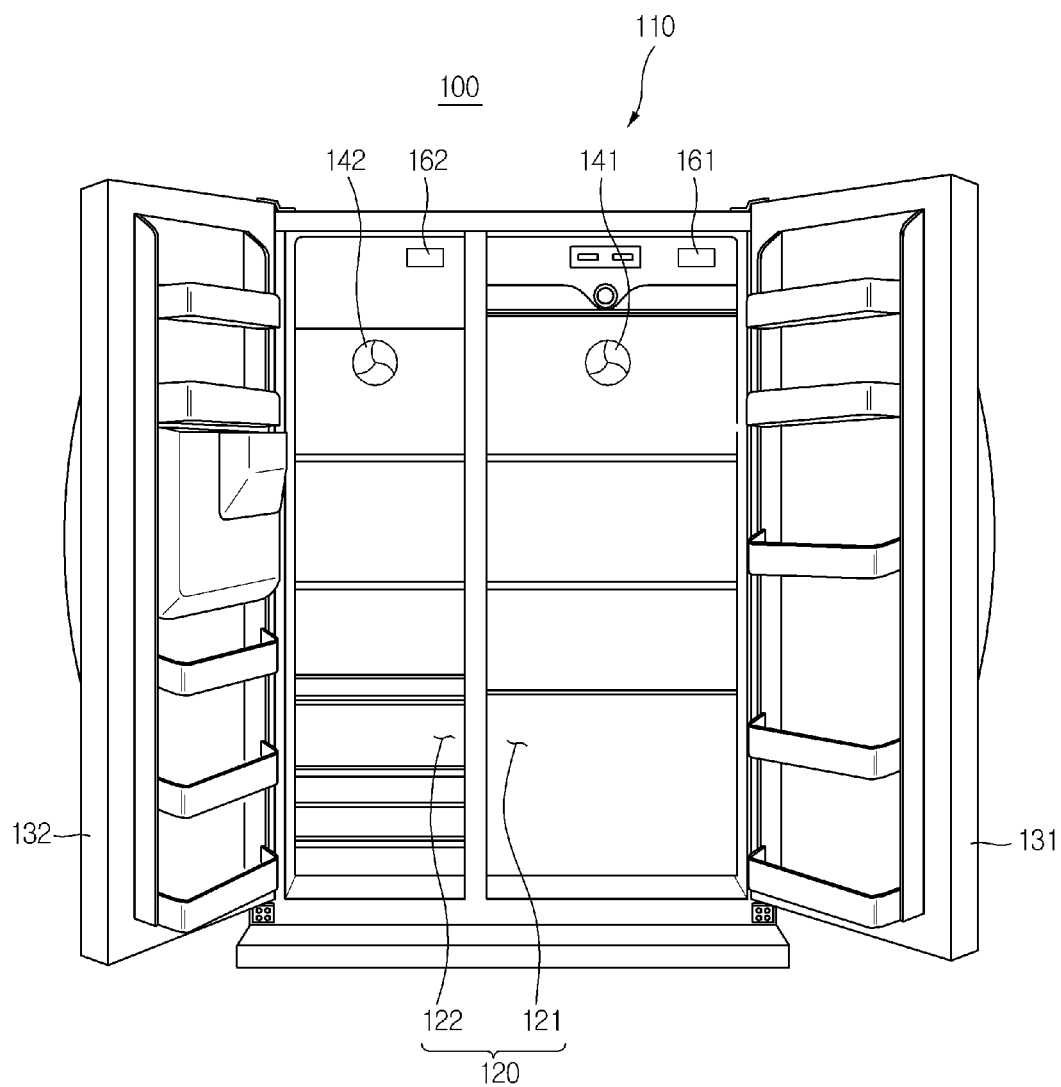
FIG. 1 is a front view illustrating a refrigerator according to an embodiment of the present disclosure.

Reference will now be made in detail to the embodiments of the present invention, examples of which are illustrated in the accompanying drawings, wherein like reference numerals refer to like elements throughout.

Figure 2:
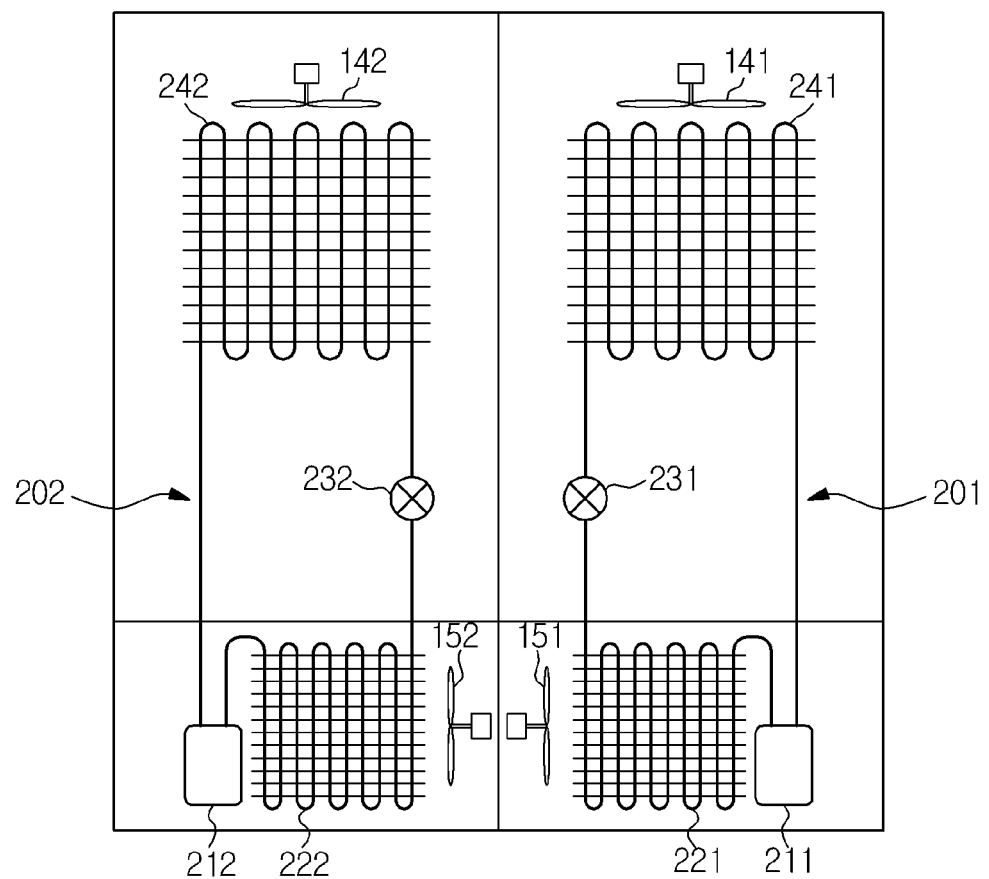
FIG. 2 is a view illustrating a cooling unit according to an embodiment of the present disclosure.
Figure 3:
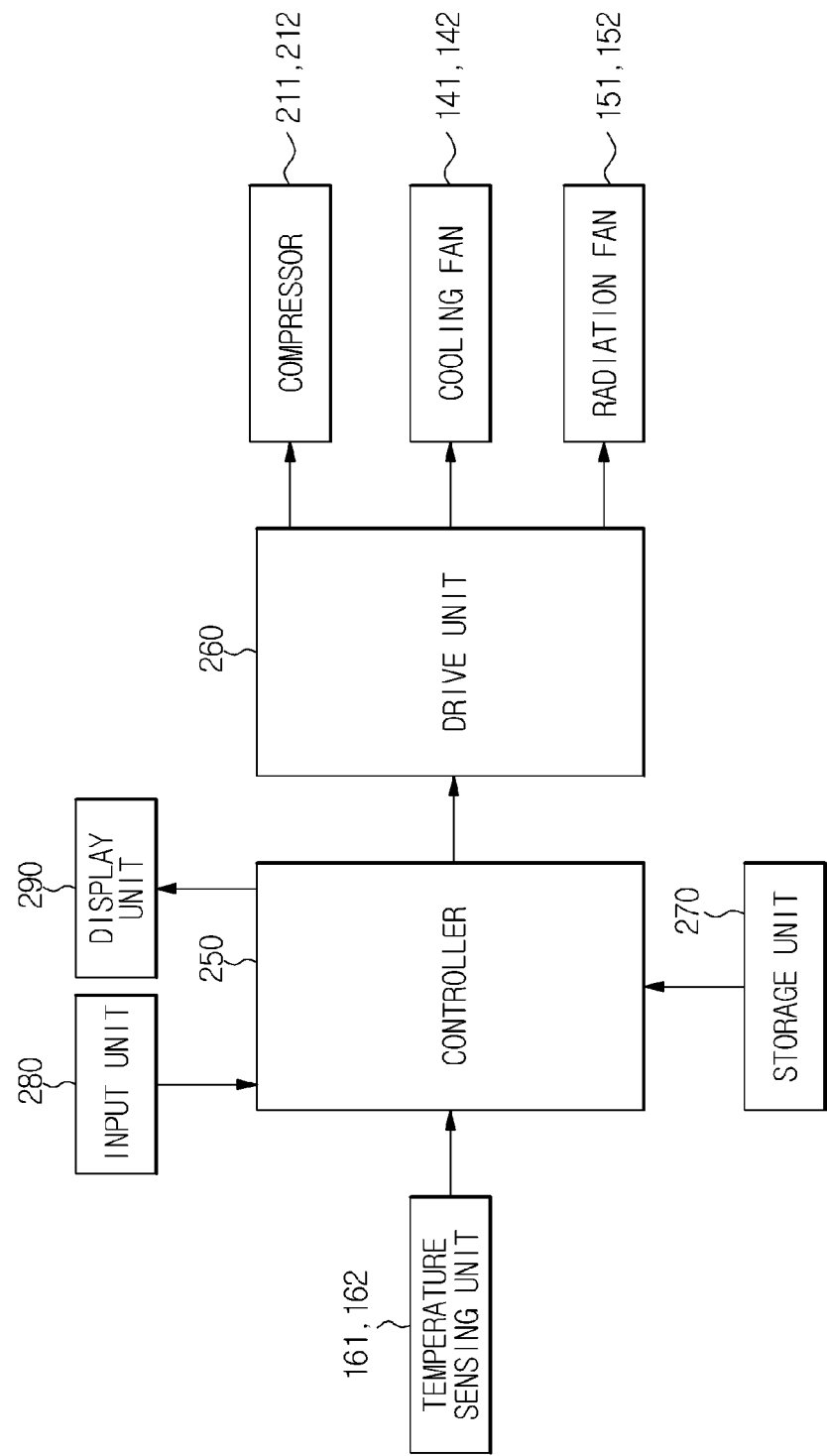
FIG. 3 is a block diagram illustrating a refrigerator according to an embodiment of the present disclosure.

FIG. 1 is a front view illustrating a refrigerator 100 according to an embodiment of the present disclosure, FIG. 2 is a view illustrating a cooling unit 200 according to an embodiment of the present disclosure, and FIG. 3 is a block diagram illustrating the refrigerator 100 according to an embodiment of the present disclosure.

Referring to FIGS. 1, 2 and 3, the refrigerator 100 according to an embodiment of the present disclosure includes a main body 110 defining an external appearance of the refrigerator 100, a storage compartment 120 in which food is stored, and a cooling unit 200 to cool the storage compartment 120.

A duct (not shown), along which air cooled by the cooling unit 200 moves, is defined in an empty wall space of the main body 110. A machine room (not shown), in which some components of the cooling unit 200 are installed, is provided in a bottom region of the main body 110.

The storage compartment 120, in which food is stored, is defined inside the main body 110.

The storage compartment 120 is divided into left and right storage compartments with an intermediate partition interposed between the compartments. Specifically, the storage compartment 120 includes a refrigerating compartment 121 in which food is kept at a temperature slightly above freezing, and a freezing compartment 122 in which food is kept below a freezing temperature. The refrigerating compartment 121 and the freezing compartment 122 have open fronts.

The respective storage compartments 120 are provided with temperature sensing units 161 and 162 to sense temperatures of the storage compartments 120. More specifically, the refrigerating compartment 121 is provided with the first temperature sensing unit 161 that senses the temperature of the refrigerating compartment 121 and outputs an electric signal corresponding to the temperature of the refrigerating compartment 121. The freezing compartment 122 is provided with the second temperature sensing unit 162 that senses the temperature of the freezing compartment 122 and outputs an electric signal corresponding to the temperature of the freezing compartment 122. The temperature sensing units 161 and 162 may include a thermistor, for example, of which an electric resistance changes with temperature.

The refrigerating compartment 121 and the freezing compartment 122 having open front sides are shielded from an exterior environment by two doors 131 and 132.

The doors 131 and 132 of the refrigerator 100 are provided with a display unit 290 that displays information regarding operation of the refrigerator 100 and a user interface panel (not shown) including an input unit 280 that receives operation instructions input by a user.

The display unit 290 may include a Liquid Crystal Display (LCD) panel or Organic Light Emitting Diode (OLED) panel. The display unit 290 displays information regarding operation of the refrigerator 100, such as the target temperature and current temperature of the refrigerating compartment 121 and the target temperature and current temperature of the freezing compartment 122. In addition, the display unit 290 may be provided with a speaker (not shown) to warn the user about abnormal operation of the refrigerator 100.

The input unit 280 may include a button switch, a membrane switch, or a touchscreen switch, for example. The input unit 280 receives operation instructions input by the user, such as power on/off of the refrigerator 100, the target temperature of the refrigerating compartment 121, and the target temperature of the freezing compartment 122, for example. The input unit 280 and the display unit 290 may be separate units, or embodied as a single integrated unit.

The cooling unit 200 includes a first cooling unit 201 to cool the refrigerating compartment 121 and a second cooling unit 202 to cool the freezing compartment 122. The first and second cooling units 201 and 202 respectively include compressors 211 and 212, condensers 221 and 222, expansion valves 231 and 232, and evaporators 241 and 242.

The compressors 211 and 212 are installed in the machine room (not shown) defined in the bottom region of the main body 110. Each compressor serves to compress low-pressure gas-phase refrigerant, evaporated by the evaporators 241 and 242 that will be described hereinafter, to high-pressure gas-phase refrigerant using a rotation power of a compressor motor that is rotated upon receiving electric power from an external power source, and to pump the same to the condensers 221 and 222.

The refrigerant may be circulated through the condensers 221 and 222, the expansion valves 231 and 232, and the evaporators 241 and 242 by pressure generated by the compressors 211 and 212. The compressors 211 and 212 play the most important role in the cooling units 201 and 202 to cool the storage compartments 121 and 122.

The compressor motor (not shown) may include an induction AC servo motor, a synchronous AC servo motor, or a BrushLess Direct Current (BLDC) motor, for example.

The condensers 221 and 222 may be installed in the machine room (not shown) defined in the bottom region of the main body 110, or may be installed in the exterior of the main body 110, such as to a rear surface of the refrigerator 100, for example.

The gas-phase refrigerant compressed by the compressors 211 and 212 is condensed to liquid-phase refrigerant while passing through the condensers 221 and 222. The refrigerant emits latent heat to the condensers 221 and 222 during a condensation thereof. Latent heat of the refrigerant refers to thermal energy emitted outward from the refrigerant as gas-phase refrigerant cooled to a boiling point of the refrigerant is changed to liquid-phase refrigerant having the same temperature, i.e. the boiling temperature. In addition, thermal energy absorbed by the refrigerant as the liquid-phase refrigerant heated to the boiling point of the refrigerant is changed to gas-phase refrigerant having the same temperature is also referred to as latent heat.

Because temperatures of the condensers 221 and 222 are raised by latent heat emitted from the refrigerant, additional radiation fans 151 and 152 may be provided to cool the condensers 221 and 222 if the condensers 221 and 222 are installed in the machine room (not shown).

The liquid-phase refrigerant condensed by the condensers 221 and 222 is depressurized by the expansion values 231 and 232. Specifically, the expansion valves 231 and 232 depressurize the high-pressure liquid-phase refrigerant to a pressure at which the refrigerant is evaporable via throttling action. The throttling action means that pressure of fluid is reduced without heat exchange with the outside as the fluid passes through a narrow path, such as a nozzle or orifice.

In addition, the expansion valves 231 and 232 may adjust an appropriate amount of the refrigerant to allow the refrigerant to absorb sufficient heat in the evaporators 241 and 242. For example, if the expansion valves 231 and 232 are electronic valves, the opening ratio of the expansion valves 231 and 232 may be adjusted in response to a control signal.

The evaporators 241 and 242 are arranged in the duct (not shown) that is defined in the empty wall space of the main body 110 as described above. The evaporators 241 and 242 serve to evaporate the low-pressure liquid-phase refrigerant depressurized by the expansion valves 231 and 232. The refrigerant absorbs latent heat from the evaporators 241 and 242 during evaporation thereof. The evaporators 241 and 242, which are deprived of thermal energy corresponding to latent heat of the refrigerant, and air around the evaporators 241 and 242 is cooled by the evaporators 241 and 242.

The low-pressure gas-phase refrigerant evaporated by the evaporators 241 and 242 is returned to the compressors 211 and 212 to repeat the refrigeration cycle.

The cooling unit 200 may further include a defrosting heater (not shown) to remove frost from the evaporators 241 and 242. Sublimation of water vapor around the evaporators 241 and 242 occurring while the evaporators 241 and 242 are cooled by the refrigerant or condensation of water vapor around the evaporators 241 and 242 may cause frost to be formed on the evaporators 241 and 242. The front formed on the evaporators 241 and 242 deteriorates heat-exchange efficiency of the evaporators 241 and 242, and consequently deteriorates a cooling efficiency of the refrigerator 100. Therefore, the defrosting heater (not shown) may be provided to remove the front from the evaporators 241 and 242.

The refrigerator 100 according to an embodiment of the present disclosure is configured such that the cooling units 201 and 202 respectively correspond to the refrigerating compartment 121 and the freezing compartment 122. That is, the first cooling unit 201 to cool the refrigerating compartment 121 includes a first compressor 211, a first condenser 221, a first expansion valve 231, and a first evaporator 241. The second cooling unit 202 to cool the freezing compartment 122 includes a second compressor 212, a second condenser 222, a second expansion valve 232, and a second evaporator 242.

The first cooling unit 201 and the second cooling unit 202 are separated from each other so as not to permit intermixing of the refrigerant, and are also spatially isolated from each other.

Cooling fans 141 and 142 realize air circulation through the duct (not shown) in the wall space of the main body 110 and the storage compartment 120. Specifically, the cooling fans 141 and 142 expel air cooled by the evaporators 241 and 242 arranged in the duct (not shown) into the storage compartments 121 and 122.

The cooling fans 141 and 142 are respectively provided at the refrigerating compartment 121 and the freezing compartment 122. Specifically, the cooling fans include a first cooling fan 141 for air circulation through the duct (not shown) provided at the refrigerating compartment 121 and the freezing compartment 122, and a second cooling fan 142 for air circulation through the duct (not shown) provided at the freezing compartment 122 and the freezing compartment 122.

A drive unit 260 drives the compressors 211 and 212, the cooling fans 141 and 142, and the radiation fans 151 and 152 in response to a control signal of a controller 250 that will be described hereinafter.

In particular, to drive the compressors 211 and 212, the drive unit 260 may include a voltage source inverter. The voltage source inverter includes a converter part to rectify commercial AC power to DC power, a condenser for DC link voltage smoothing, and an inverter part for simultaneous control of rectified DC voltage and frequency in a Pulse Width Modulation (PWM) manner.

A storage unit 270 stores control programs and control data for control of the operation of the refrigerator 100. Specifically, the storage unit 270 may include a non-volatile memory (not shown) for permanent storage of control programs and control data, such as a magnetic disc, a solid state disc, and the like, and a volatile memory (not shown) for temporary storage of data generated in the course of controlling operation of the refrigerator 100, such as a D-RAM, S-RAM, and the like.

The controller 250 controls an overall operation of the refrigerator 100. Specifically, the controller 250 controls the drive unit 260 to cool the refrigerating compartment 121 or the freezing compartment 122 based on a user instruction input via the input unit 280 and based on results sensed by the temperature sensing units 161 and 162.

The configuration of the refrigerator 100 has been described above. Hereinafter, operation of the refrigerator 100 will be described.

Operation of the refrigerator 100 may be divided into an initial operation mode, a normal operation mode, and an abnormal operation mode.

The initial operation mode refers to the case in which power is initially applied to the refrigerator 100, or when the refrigerator 100 is powered on. In the initial operation mode, the temperature of the storage compartments 121 and 122 is a room temperature of 25° C., and the cooling unit 200 is in an un-driven state.

The normal operation mode refers to the case in which the storage compartments 121 and 122 are kept at a constant temperature. In the normal operation mode, the temperature of the storage compartment 120 is lowered as the cooling unit 200 is driven. That is, if the cooling unit 200 is normally driven in a state in which the storage compartment 120 is closed by the doors 131 and 132, this corresponds to the normal operation mode.

The abnormal operation mode refers to the case in which the temperature of the storage compartment 120 is continuously raised. In the abnormal operation mode, lowering the temperature of the storage compartment 120 may be impossible despite driving the cooling unit 200. For example, the case in which the doors 131 and 132 of the storage compartments 121 and 122 are opened, or the case in which heat exchange is not implemented due to frost formed on the evaporators 241 and 242 corresponds to the abnormal operation mode.

The refrigerator 100 determines whether or not driving requirements, or conditions, of the cooling unit 200 are satisfied based on results sensed by the temperature sensing units 161 and 162 provided in the storage compartment 120. If the driving requirements of the cooling unit 200 are satisfied, the refrigerator 100 drives the cooling unit 200 to cool the storage compartment 120. The driving requirements of the cooling unit 200 are conditions required to initiate driving the cooling unit 200 in order to keep the first storage compartment 121 and the second storage compartment 122 at predetermined target temperatures. As will be described hereinafter, the refrigerator 100 drives the cooling unit 200 to cool the storage compartment 120 when the temperature of the storage compartment 120 reaches or exceeds an upper limit temperature.

For long-term storage of food, a primary function of the refrigerator 100, a target temperature of the refrigerator 100 is predetermined. The target temperature is initially set at the manufacturing stage of the refrigerator 100 and may be changed later via user manipulation.

For example, the refrigerating compartment 121, which keeps food at a temperature slightly above freezing, may have a target refrigerating temperature of approximately 4° C., and the freezing compartment 122, which keeps food below a freezing temperature, may have a target freezing temperature of approximately −20° C.

The refrigerator 100 sets the driving requirements to initiate driving the cooling unit 200 in order to keep the storage compartment 120 at the target temperature. In other words, when the temperature of the storage compartment 120 reaches or exceeds a predetermined upper limit temperature, the refrigerator 100 drives the cooling unit 200 to cool the storage compartment. Simultaneously, the refrigerator 100 sets driving stop requirements to stop driving the cooling unit 200. In other words, when the temperature of the storage compartment 120 reaches or falls below a predetermined lower limit temperature, the refrigerator 100 stops driving the cooling unit 200 so as not to cool the storage compartment. Here, the upper limit temperature may be set to be 1° C. higher than the target temperature, and the lower limit temperature may be set to be 1° C. lower than the target temperature, for example.

For example, if the target refrigerating temperature of the refrigerating compartment 121 is 4° C., a refrigerating upper limit temperature may be 5° C. and a refrigerating lower limit temperature may be 3° C. In addition, if the target freezing temperature of the freezing compartment 122 is −20° C., a freezing upper limit temperature may be −19° C. and a freezing lower limit temperature may be −21° C. That is, the first compressor 211 included in the first cooling unit 201 initiates driving thereof to cool the refrigerating compartment 121 when the temperature of the refrigerating compartment 121 reaches or exceeds 5° C., and driving the first compressor 211 stops when the temperature of the refrigerating compartment 121 reaches 3° C. In addition, the second compressor 212 included in the second cooling unit 202 initiates driving thereof to cool the freezing compartment 122 if the temperature of the freezing compartment 122 reaches or exceeds −19° C., and driving the second compressor 212 stops if the temperature of the freezing compartment 122 reaches −21° C.

As such, the refrigerator 100 controls driving the cooling unit 200 based on the temperatures of the storage compartments 121 and 122. In this case, simultaneous driving the first cooling unit 201 and the second cooling unit 202, i.e. simultaneous driving the first compressor 211 and the second compressor 212, may occur. If the first compressor 211 and the second compressor 212 are simultaneously driven, however, the refrigerator 100 may suffer from a significant increase in noise and vibration, as well as excessive power consumption.

Accordingly, minimizing simultaneous driving the first compressor 211 included in the first cooling unit 201 and the second compressor 212 included in the second cooling unit 202 may be necessary. To this end, while any one of the first cooling unit 201 or the second cooling unit 202 is being driven, the refrigerator 100 may delay driving the other cooling unit until delayed driving requirements of the other cooling unit are satisfied, even if driving the other cooling unit would normally occur to lower a temperature. In other words, while any one of the first cooling unit 201 or the second cooling unit 202 is being driven, driving the other cooling unit is initiated only after the other cooling unit satisfies the delayed driving requirements. The delayed driving requirements may include determining that a predetermined delay time has passed, and that the temperature of the storage compartment reaches a delay temperature higher than the upper limit temperature that satisfies the driving requirements.

Hereinafter, operation of the refrigerator 100 depending on each operation mode of the refrigerator 100 will be described.

First, operation of the refrigerator 100 in the initial operation mode of the refrigerator 100 will be described.

The refrigerator 100 determines the initial operation mode if the temperatures of all the storage compartments 120 reach or exceed the respective upper limit temperatures in an un-driven state of all the cooling units 200, and then determines the end of the initial operation mode if the temperature of any one of the refrigerating compartment 121 and the freezing compartment 122 reaches or falls below the lower limit temperature via driving the first cooling unit 201 or the second cooling unit 202. Of course, the disclosure is not limited to the above description, and end of the initial operation mode may be determined if the temperatures of both the refrigerating compartment 121 and the freezing compartment 122 fall below the respective lower limit temperatures.

If any one of the first cooling unit 201 or the second cooling unit 202 is being driven in the initial operation mode of the refrigerator 100, the refrigerator 100 does not drive the other cooling unit for a predetermined delay time.

More specifically, when power is initially applied to the refrigerator 100, both the first cooling unit 201 and the second cooling unit 202 are in an un-driven state and the temperatures of the refrigerating compartment 121 and the freezing compartment 122 are respectively higher than the refrigerating upper limit temperature and the freezing upper limit temperature. In this case, the refrigerator 100 may randomly drive any one of the first cooling unit 201 and the second cooling unit 202. If the second cooling unit 202 is first driven in the initial operation mode, the refrigerator 100 drives the first cooling unit 201 after a predetermined delay time has passed. The delay time may be set based on storage capacity of the refrigerator 100, or cooling capacity of the refrigerator 100, for example.

The refrigerator 100 may drive the first cooling unit 201 when the delay time has passed even during driving the second cooling unit 202. That is, the refrigerator 100 may not stop driving the second cooling unit 202. In this case, both the first cooling unit 201 and the second cooling unit 202 may be driven when the delay time has passed after power is initially applied to the refrigerator 100. In the case in which the first cooling unit 201 and the second cooling unit 202 are driven simultaneously, the refrigerator 100 may reduce driving rates of the first compressor 211 and the second compressor 212 of the first cooling unit 201 and the second cooling unit 202. In other words, the refrigerator 100 may reduce noise and vibration caused by driving the compressors 211 and 212, as well as power consumption of the compressors 211 and 212, by reducing rates of rotation of the first compressor 211 and the second compressor 212 (more accurately, rates of rotation of the compressor motors (not shown) included in the first compressor 211 and the second compressor 212).

Although the refrigerator 100 has been described as driving the first cooling unit 201 and the second cooling unit 202 simultaneously when the delay time has passed after power is initially applied to the refrigerator 100 and driving the second cooling unit 202 is initiated, the disclosure is not limited thereto, and the refrigerator 100 may stop driving the second cooling unit 202 while continuously driving only the first cooling unit 201 when the delay time has passed after power is initially applied to the refrigerator 100 and driving the second cooling unit 202 is initiated. That is, the first cooling unit 201 and the second cooling unit 202 may be alternately driven whenever the delay time has passed.

Next, operation of the refrigerator 100 in the normal operation mode of the refrigerator 100 will be described.

When several minutes to several hours have passed after power is initially applied to the refrigerator 100, the temperature of any one of the refrigerating compartment 121 and the freezing compartment 122 reaches or falls below the lower limit temperature. In this case, the refrigerator 100 is in the normal operation mode. As described above, in the normal operation mode, the temperature of the storage compartment 120 is lowered as the refrigerator 100 drives the cooling unit 200.

In the normal operation mode, if any one of the first cooling unit 201 or the second cooling unit 202 is being driven, the refrigerator 100 does not drive the other cooling unit until the temperature of the storage compartment that is cooled by the other cooling unit reaches the delay temperature higher than the upper limit temperature. For example, if the first cooling unit 201 is being driven, the refrigerator 100 drives the second cooling unit 202 only after the temperature of the freezing compartment 122 reaches or exceeds a freezing delay temperature that is higher than the freezing upper limit temperature. In other words, while the first cooling unit 201 is being driven, the second cooling unit 202 is not driven if the temperature of the freezing compartment 122 is lower than the freezing delay temperature, even if the temperature of the freezing compartment 122 is higher than the freezing upper limit temperature.

In addition, if the temperature of the storage compartment, which is lowered via driving the first cooling unit 201 or the second cooling unit 202, reaches the lower limit temperature and thus driving the corresponding cooling unit stops, the refrigerator 100 drives the other cooling unit. For example, in the case in which the first cooling unit 201 is being driven and driving the second cooling unit 202 is delayed, the refrigerator 100 stops driving the first cooling unit 201 and drives the second cooling unit 202 if the temperature of the refrigerating compartment 121 reaches the refrigerating lower limit temperature even before the temperature of the freezing compartment 122 reaches the freezing delay temperature. Because driving the first cooling unit 201 stops even if the temperature of the freezing compartment 122 is less than the freezing delay temperature, the refrigerator 100 may drive the second cooling unit 202 when the temperature of the freezing compartment 122 reaches the freezing upper limit temperature.

If the refrigerator 100 delays driving any one of the cooling units while the other cooling unit is being driven such that the temperature of the storage compartment that is cooled by the delayed cooling unit reaches or exceeds the delay temperature, the refrigerator 100 may drive both the cooling units. For example, if the temperature of the freezing compartment 122 reaches the freezing delay temperature while the first cooling unit 201 is being driven, the refrigerator 100 may drive both the first cooling unit 201 and the second cooling unit 202. In the case in which both the first cooling unit 201 and the second cooling unit 202 are driven, to reduce noise and vibration caused by driving the two compressors 211 and 212, the refrigerator 100 may reduce rates of rotation of the compressors 211 and 212 of the first cooling unit 201 and the second cooling unit 202 (more accurately, rates of rotation of the compressor motors (not shown) included in the first compressor 211 and the second compressor 212).

Moreover, if the refrigerator 100 delays driving any one of the cooling units while the other cooling unit is being driven such that the temperature of the storage compartment that is cooled by the delayed cooling unit reaches or exceeds the delay temperature, the refrigerator 100 may stop the cooling unit that is being driven and drive the delayed cooling unit. For example, if the temperature of the freezing compartment 122 reaches or exceeds the freezing delay temperature while the first cooling unit 201 is being driven, the refrigerator 100 may stop driving the first cooling unit 201 and drive the second cooling unit 202.

The delay temperature may be set based on storage capacity of the refrigerator 100, cooling capacity of the refrigerator 100, and the target temperature of the storage compartment 120, for example.

For example, the refrigerating delay temperature may be set to 7° C., higher than the refrigerating upper limit temperature of 5° C., and the freezing delay temperature may be set to −18° C., higher than the freezing upper limit temperature of −19° C. That is, if the second cooling unit 202 to cool the freezing compartment 122 is being driven, the first cooling unit 201 is not driven until the temperature of the refrigerating compartment 121 reaches the refrigerating delay temperature of 7° C., which is higher than the refrigerating upper limit temperature of 5° C. Naturally, the first cooling unit 201 may be driven if driving the second cooling unit 202 stops even before the temperature of the refrigerating compartment 121 reaches 7° C. In addition, in the case in which the first cooling unit 201 to cool the refrigerating compartment 121 is being driven, the second cooling unit 202 is not driven until the temperature of the freezing compartment 122 reaches the freezing delay temperature of −18° C., which is higher than the freezing upper limit temperature of −19° C. Naturally, the second cooling unit 201 may be driven if driving the first cooling unit 201 stops even before the temperature of the freezing compartment 122 reaches −18° C.

Figure 4:
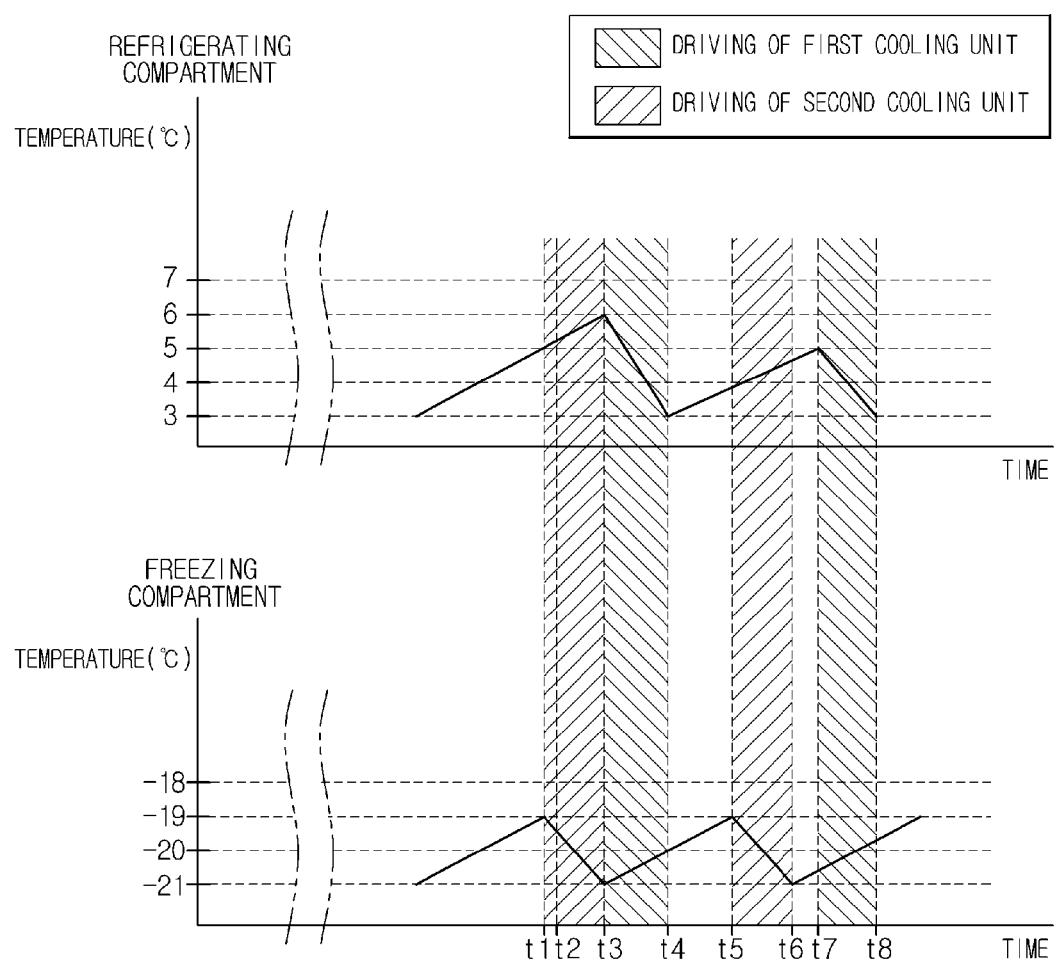
FIG. 4 is a view showing temperature variation of a first storage compartment and a second storage compartment in a normal operation mode of the refrigerator according to an embodiment of the present disclosure.

FIG. 4 is a view showing temperature variation of the first storage compartment 121 and the second storage compartment 122 in the normal operation mode of the refrigerator 100 according to an embodiment of the present disclosure.

Referring to FIG. 4, as the temperature of the freezing compartment 122 reaches the freezing upper limit temperature of −19° C. at a time t after the refrigerator 100 enters the normal operation mode, the second cooling unit 202 is driven. Thereafter, even if the temperature of the refrigerating compartment 121 reaches the refrigerating upper limit temperature of 5° C. at a time t2, the first cooling unit 201 is not driven because the second cooling unit 202 is being driven. Thereafter, when the temperature of the freezing compartment 122 reaches the freezing lower limit temperature of −21° C. at a time t3, driving the second cooling unit 202 stops and the first cooling unit 201 is driven because the temperature of the refrigerating compartment 121 is the refrigerating upper limit temperature of 5° C.

As shown in FIG. 4, in the normal operation mode, the refrigerator 100 may minimize simultaneous driving the first cooling unit 201 and the second cooling unit 202.

Finally, the abnormal operation mode of the refrigerator 100 occurs in the case in which any one or both of the two doors 131 and 132 used to close the storage compartment 120 are opened, or occurs in the case in which the evaporators 241 and 242 of the cooling unit 200 do not implement heat exchange. In the abnormal operation mode, the temperature of the storage compartment 120 is not lowered despite driving the cooling unit 200.

If it is determined that the refrigerator 100 is in the abnormal operation mode based on results sensed by the temperature sensing units 161 and 162, the refrigerator 100 warns the user about the abnormal operation of the refrigerator 100 via the speaker (not shown) provided at the display unit 290.

If abnormal operation is sensed in both the refrigerating compartment 121 and the freezing compartment 122, that is, if it is determined that both the doors 131 and 132 of the refrigerator 100 are opened, the refrigerator 100 may alternately drive the first cooling unit 201 and the second cooling unit 202 at a predetermined delay time interval. However, the disclosure is not limited thereto, and the refrigerator 100 may drive both the first cooling unit 201 and the second cooling unit 202. However, in the case in which both the first cooling unit 201 and the second cooling unit 202 are driven, to reduce noise and vibration caused by driving the two compressors 211 and 212, the refrigerator 100 may reduce rates of rotation of the compressors 211 and 212 of the first cooling unit 201 and the second cooling unit 202 (more accurately, rates of rotation of the compressor motors (not shown) included in the first compressor 211 and the second compressor 212).

If abnormal operation is sensed only in the refrigerating compartment 121 and normal operation is sensed in the freezing compartment 122, that is, if the temperature of the refrigerating compartment 121 is not lowered despite driving the first cooling unit 201, the refrigerator 100 continuously drives the first cooling unit 201 in the normal operation mode of the second cooling unit 202. That is, through continuous driving the first cooling unit 201, the second cooling unit 202 is driven when the temperature of the freezing compartment reaches or exceeds the freezing delay temperature, and stops driving when the temperature of the freezing compartment reaches or falls below the freezing lower limit temperature. In this case, both the first cooling unit 201 and the second cooling unit 202 may be driven simultaneously. In the case in which both the first cooling unit 201 and the second cooling unit 202 are driven simultaneously, to reduce noise and vibration caused by driving the two compressors 211 and 212, the refrigerator 100 may reduce rates of rotation of the compressors 211 and 212 of the first cooling unit 201 and the second cooling unit 202 (more accurately, rates of rotation of the compressor motors (not shown) included in the first compressor 211 and the second compressor 212).

In addition, the refrigerator 100 may drive the first cooling unit 201 while the second cooling unit 202 is in an un-driven state in the normal operation mode of the second cooling unit 202. In this case, it may be possible to minimize simultaneous driving both the first cooling unit 201 and the second cooling unit 202.

Hereinafter, operation of the refrigerator 100 will be described with reference to FIG. 4 that illustrates temperature variation of the refrigerating compartment 121 and the freezing compartment 122 caused by operation of the refrigerator 100 according to an embodiment of the present disclosure. It is assumed that with the refrigerating compartment 121 has the refrigerating target temperature of 4° C., the refrigerating lower limit temperature of 3° C., the refrigerating upper limit temperature of 5° C., and the refrigerating delay temperature of 7° C., and the freezing compartment 122 has the freezing target temperature of −20° C., the freezing lower limit temperature of −21° C., the freezing upper limit temperature of −19° C., and the freezing delay temperature of −18° C.

Figure 5:
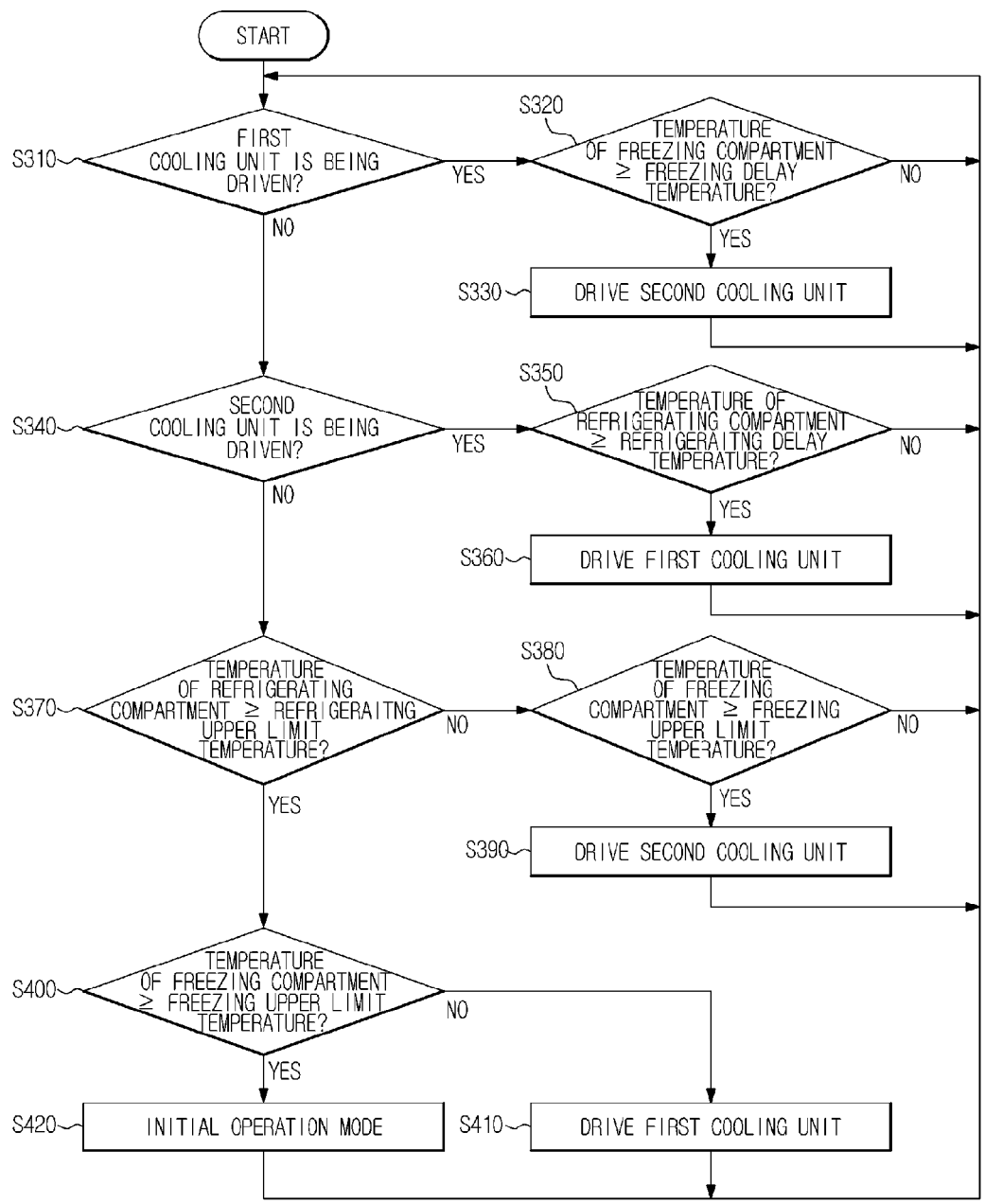
FIG. 5 is a flowchart illustrating a control method for the refrigerator according to an embodiment of the present disclosure.
Figure 6:
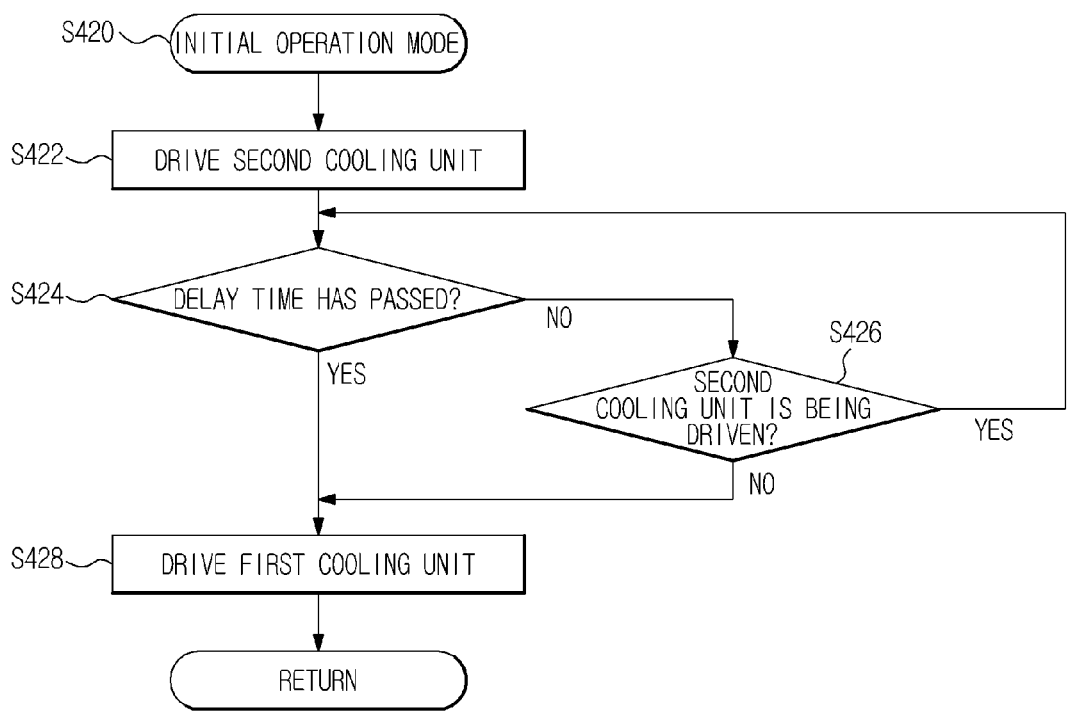
FIG. 6 is a flowchart illustrating the control method in an initial operation mode of the refrigerator according to an embodiment of the present disclosure.
Figure 7:
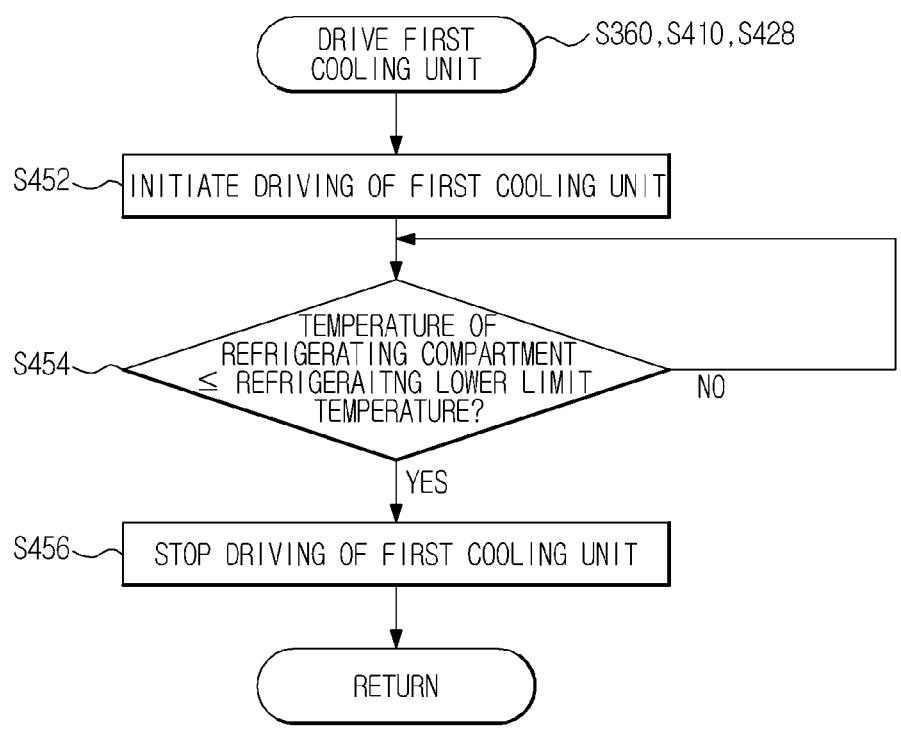
FIG. 7 is a flowchart illustrating the control method upon driving a first cooling unit of the refrigerator according to an embodiment of the present disclosure.
Figure 8:
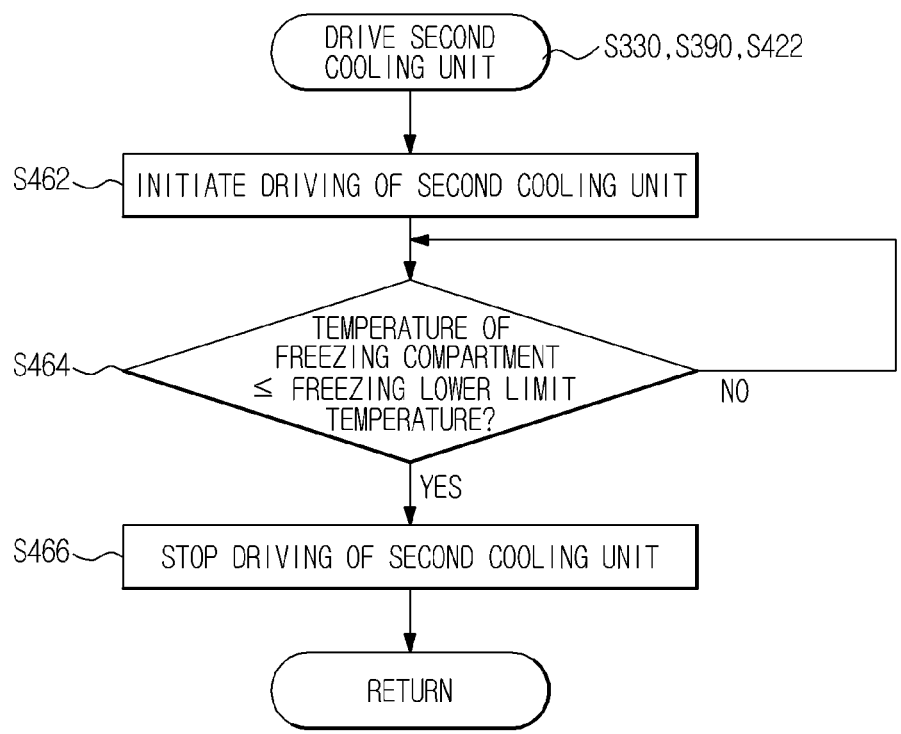
FIG. 8 is a flowchart illustrating the control method upon driving a second cooling unit of the refrigerator according to an embodiment of the present disclosure.

FIG. 5 is a flowchart illustrating a control method for the refrigerator according to an embodiment of the present disclosure, FIG. 6 is a flowchart illustrating the control method in the initial operation mode of the refrigerator according to an embodiment of the present disclosure, and FIGS. 7 and 8 are flowcharts illustrating the control method upon driving the first cooling unit and the second cooling unit of the refrigerator, respectively, according to an embodiment of the present disclosure.

Referring to FIG. 5, the refrigerator 100 first determines whether or not the first cooling unit 201 is being driven (operation S310).

If the first cooling unit 201 is being driven (Yes of operation S310), the refrigerator 100 determines whether or not the temperature of the freezing compartment 122 reaches or exceeds the freezing delay temperature (operation S320).

If the temperature of the freezing compartment 122 is less than the freezing delay temperature (No of operation S320), the refrigerator 100 continuously determines whether or not the first cooling unit 201 is being driven and whether or not the temperature of the freezing compartment 122 reaches or exceeds the freezing delay temperature until the first cooling unit 201 stops driving or the temperature of the freezing compartment 122 reaches or exceeds the freezing delay temperature.

If the temperature of the freezing compartment 122 reaches or exceeds the freezing delay temperature (Yes of operation S320), the refrigerator 100 drives the second cooling unit 202 (operation S330). In this case, after driving the second cooling unit 202 is initiated (operation S462), the refrigerator 100 determines whether or not the temperature of the freezing compartment 122 is equal to or less than the freezing lower limit temperature (operation S464). If the temperature of the freezing compartment 122 reaches or falls below the freezing lower limit temperature (Yes of operation S464), the refrigerator 100 stops driving the second cooling unit 202 (operation S466) (See FIG. 8).

If the first cooling unit 201 is in an un-driven state (No of operation S310), the refrigerator 100 determines whether or not the second cooling unit 202 is being driven (operation S340).

If the second cooling unit 202 is being driven (Yes of operation S340), the refrigerator 100 determines whether or not the temperature of the refrigerating compartment 121 reaches or exceeds the refrigerating delay temperature (operation S350).

If the temperature of the refrigerating compartment 121 is less than the refrigerating delay temperature (No of operation S350), the refrigerator 100 determines whether or not the second cooling unit 202 is being driven and whether or not the temperature of the refrigerating compartment 121 reaches or exceeds the refrigerating delay temperature until the second cooling unit 202 stops driving or the temperature of the refrigerating compartment 121 reaches or exceeds the refrigerating delay temperature.

If the temperature of the refrigerating compartment 121 reaches or exceeds the refrigerating delay temperature (Yes of operation S350), the refrigerator 100 drives the first cooling unit 201 (operation S360). In this case, after driving the first cooling unit 201 is initiated (operation S452), the refrigerator 100 determines whether or not the temperature of the refrigerating compartment 121 reaches or falls below the refrigerating lower limit temperature (operation S454). If the temperature of the refrigerating compartment 121 reaches or falls below the refrigerating lower limit temperature (Yes of operation S454), the refrigerator 100 stops driving the first cooling unit 201 (operation S456) (See FIG. 7).

If the second cooling unit 202 is in an un-driven state, that is, if both the first cooling unit 201 and the second cooling unit 202 are in an un-driven state, the refrigerator 100 determines whether or not the temperature of the refrigerating compartment 121 reaches or exceeds the refrigerating upper limit temperature (operation S370).

If the temperature of the refrigerating compartment 121 is less than the refrigerating upper limit temperature (No of operation S370), the refrigerator 100 determines whether or not the temperature of the freezing compartment 122 reaches or exceeds the freezing upper limit temperature (operation S380).

If the temperature of the freezing compartment 122 reaches or exceeds the freezing upper limit temperature (Yes of operation S380), the refrigerator 100 drives the second cooling unit 202 (operation S390). In this case, after driving the second cooling unit 202 is initiated (operation S462), the refrigerator 100 determines whether or not the temperature of the freezing compartment 122 reaches or falls below the freezing lower limit temperature (operation S464). If the temperature of the freezing compartment 122 reaches or falls below the freezing lower limit temperature (Yes of operation S464), the refrigerator 100 stops driving the second cooling unit 202 (operation S466) (See FIG. 8).

If the temperature of the freezing compartment 122 is less than the freezing lower limit temperature (No of operation S380), that is, if both the first cooling unit 201 and the second cooling unit 202 are in an un-driven state and the temperatures of the freezing compartment 121 and the freezing compartment 122 are less than the respective upper limit temperatures, the refrigerator 100 determines whether or not the first cooling unit is being driven (operation S310).

If the temperature of the refrigerating compartment 121 reaches or exceeds the refrigerating upper limit temperature (Yes of operation S370), the refrigerator 100 determines whether or not the temperature of the freezing compartment 122 reaches or exceeds the freezing upper limit temperature (operation S400). If the temperature of the freezing compartment 122 is less than the freezing upper limit temperature (No of operation S400), the refrigerator 100 drives the first cooling unit 201 (operation S410). In this case, after driving the first cooling unit 201 is initiated (operation S452), the refrigerator 100 determines whether or not the temperature of the refrigerating compartment 121 reaches or falls below the refrigerating lower limit temperature (operation S454). If the temperature of the refrigerating compartment 121 reaches or falls below the refrigerating lower limit temperature, the refrigerator 100 stops driving the first cooling unit 201 (operation S456) (See FIG. 7).

If the temperature of the freezing compartment 122 reaches or exceeds the freezing upper limit temperature (Yes of operation S400), that is, if both the first cooling unit 201 and the second cooling unit 202 are in an un-driven state and the temperatures of the freezing compartment 121 and the freezing compartment 122 reach or exceed the respective upper limit temperatures, the refrigerator 100 enters the initial operation mode (operation S420).

If the refrigerator 100 enters the initial operation mode (operation S420), the refrigerator 100 drives the second cooling unit 202 (operation S422), and determines whether or not a delay time has passed after the second cooling unit 202 is driven (operation S424).

If the delay time has not passed (No of operation S424), the refrigerator 100 determines whether or not the second cooling unit 202 is being driven (operation S426).

If the second cooling unit 202 is being driven (Yes of operation S426), the refrigerator 100 iteratively determines whether or not the delay time has passed (operation S424).

If the second cooling unit 202 is in an un-driven state (No of operation S426), that is, if the temperature of the freezing compartment 122 reaches the freezing lower limit temperature and the second cooling unit 202 stops driving, the refrigerator 100 drives the first cooling unit 201 (operation S428).

If the delay time has passed (Yes of operation S424), the refrigerator 100 drives the first cooling unit 201 (operation S428).

As is apparent from the above description, according to an aspect of the present disclosure, it may be possible to minimize simultaneous driving a plurality of compressors, which may prevent generation of noise and vibration, as well as excessive power consumption due to driving the plurality of compressors.

The above-described embodiments may be recorded in computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

Although the embodiments of the present disclosure have been shown and described, it would be appreciated by those skilled in the art that changes may be made in the embodiment without departing from the principles and spirit of the disclosure, the scope of which is defined in the claims and their equivalents.

What is claimed is:

1. A refrigerator comprising:
   a plurality of storage compartments;
   a plurality of cooling units configured to cool the plurality of storage compartments, each of the plurality of cooling units including a compressor;
   a temperature sensing unit configured to sense temperatures of each of the plurality of storage compartments; and
   a controller configured to initiate driving a first cooling unit among the plurality of cooling units when a temperature of a first storage compartment reaches or exceeds a first reference temperature,
   wherein, while a second cooling unit among the plurality of cooling units is being driven, the controller initiates the driving of the first cooling unit when the temperature of the first storage compartment reaches or exceeds a second reference temperature higher than the first reference temperature.

2. The refrigerator according to claim 1, wherein the controller initiates the driving of the first cooling unit when a predetermined delay time has passed after the temperature of the first storage compartment reaches or exceeds the first reference temperature if the second cooling unit is being driven.

3. The refrigerator according to claim 1, wherein the controller reduces driving rates of the first cooling unit and the second cooling unit while the first cooling unit and the second cooling unit are driven simultaneously.

4. The refrigerator according to claim 1, wherein the controller stops driving the second cooling unit if the controller initiates the driving of the first cooling unit.

5. A control method for a refrigerator comprising a plurality of storage compartments, a plurality of cooling units to cool the plurality of storage compartments, each of the plurality of cooling units including a compressor, and a temperature sensing unit to sense temperatures of each of the plurality of storage compartments, the control method comprising:
   detecting a temperature of a first storage compartment among the plurality of storage compartments;
   determining whether a second cooling unit among the plurality of cooling units is being driven;
   while the second cooling unit is not being driven, initiating driving the first cooling unit when the temperature of the first storage compartment reaches or exceeds a first reference temperature; and
   while the second cooling unit is being driven, initiating the driving of the first cooling unit when the temperature of the first storage compartment reaches or exceeds a second reference temperature higher than the first reference temperature.

6. The method according to claim 5, further comprising reducing driving rates of the first cooling unit and the second cooling unit while the first cooling unit and the second cooling unit are driven simultaneously.

7. The method according to claim 5, further comprising stopping the driving the second cooling unit if the controller initiates the driving of the first cooling unit.

8. A refrigerator comprising:
   a refrigerating compartment;
   a freezing compartment spatially separated from the refrigerating compartment;
   a first cooling unit including a first compressor and configured to cool the refrigerating compartment;
   a second cooling unit including a second compressor and configured to cool the freezing compartment;
   a temperature sensing unit configured to sense temperatures of the refrigerating compartment and the freezing compartment; and
   a controller configured to initiate driving the first cooling unit when a temperature of the refrigerating compartment is above a first reference temperature, and to initiate driving the first cooling unit when the temperature of the refrigerating compartment is above a second reference temperature while the second cooling unit is being driven,
   wherein the second reference temperature is higher than the first reference temperature.

9. The refrigerator according to claim 8, wherein the controller is configured to delay driving the first cooling unit for a predetermined time duration while the second cooling unit is being driven.

10. The refrigerator according to claim 8, wherein the controller is configured to initiate driving the second cooling unit when a temperature of the freezing compartment is above a third reference temperature, and the controller is configured to initiate driving the second cooling unit when the temperature of the freezing compartment is above a fourth reference temperature while the first cooling unit is being driven,
   wherein the fourth reference temperature is higher than the third reference temperature.

11. The refrigerator according to claim 10, wherein the controller is configured to delay driving the second cooling unit for a predetermined time duration while the first cooling unit is being driven.

12. The refrigerator according to claim 10, wherein the controller is configured to stop driving the first cooling unit when the temperature of the freezing compartment is above the fourth reference temperature while the first cooling unit is being driven.

* * * * *